United States Patent [19]

Kuramoto et al.

[11] Patent Number: 5,037,131
[45] Date of Patent: Aug. 6, 1991

[54] PROTECTING DEVICE FOR CABLES OF A STEERING COLUMN

[75] Inventors: Masanori Kuramoto; Hiroyuki Bannai, both of Miyagi; Shunichi Toyomasu, Atugi; Kazuyuki Mori, Chigasaki, all of Japan

[73] Assignees: Alps Electric Co., Ltd., Tokyo; Nissan Motor Co., Ltd., Kanagawa, both of Japan

[21] Appl. No.: 554,767

[22] Filed: Jul. 18, 1990

[30] Foreign Application Priority Data

Aug. 5, 1989 [JP] Japan .............................. 1-202285
Aug. 5, 1989 [JP] Japan .............................. 1-202286

[51] Int. Cl.$^5$ ............................................. B62D 1/18
[52] U.S. Cl. .................................... 280/775; 280/777; 74/484 R
[58] Field of Search .............. 280/775, 777; 74/489 R

[56] References Cited

U.S. PATENT DOCUMENTS

| | | | |
|---|---|---|---|
| 4,429,588 | 2/1984 | Emmundts et al. | 280/775 |
| 4,516,440 | 5/1985 | Nishikawa | 280/775 |
| 4,602,520 | 7/1986 | Nishikawa et al. | 280/775 |
| 4,753,121 | 6/1988 | Venable et al. | 280/775 |

Primary Examiner—Kenneth R. Rice
Attorney, Agent, or Firm—Guy W. Shoup

[57] ABSTRACT

A harness protecting device of a steering column having a telescopic function includes a protector, having a cable penetrating section in the front and the rear, equipped so as to contract and expand at will across the fixing and moving sides of the steering column having the telescopic function. A pair of flexible bow-like holders in the protector, for dividing a plurality of single core cables from the penetrating section, into two in the width direction of the protector in order to retain the cables. The cables, which are connected to electrical equipment attached to the moving side of the steering column, and which are wired along the steering column, are wired along the bow-like holders in the protector so as to contract and expand. Further, the harness protecting device includes a connecting part, with bifurcated connecting rods, equipped to the moving side of the steering column, and a box-like fixing housing which is equipped to the fixing side of the steering column, and which is slidably connected to the connecting rods of the connecting part. The cables are housed in a space partitioned by the connecting part and the fixing housing, and are arranged so as to contract and expand in the width direction of the fixing housing in the space.

5 Claims, 6 Drawing Sheets

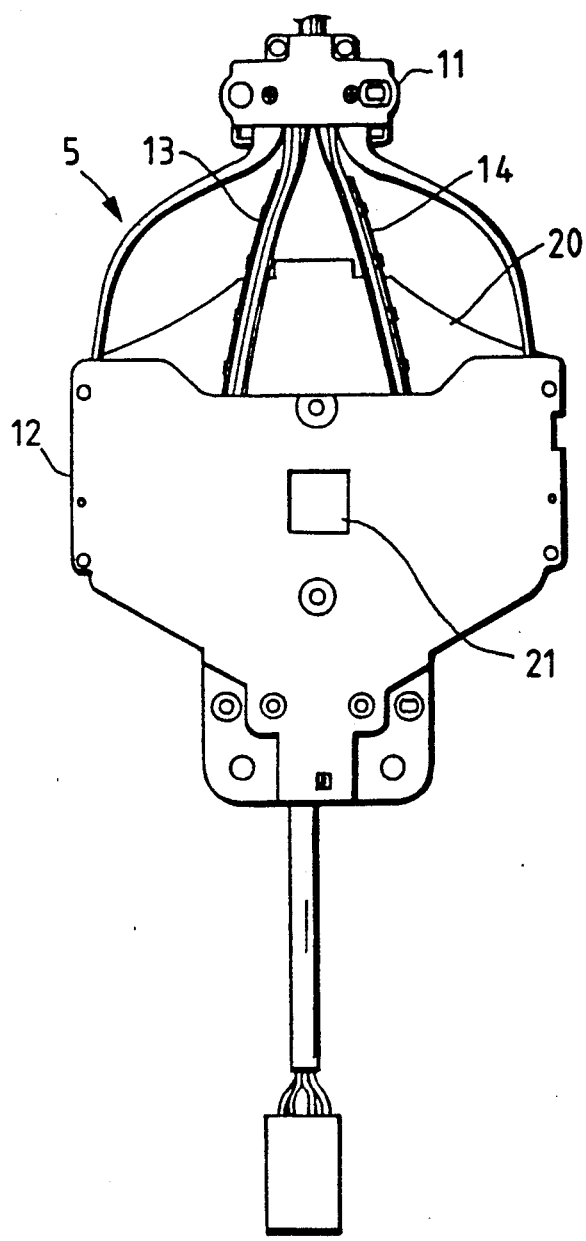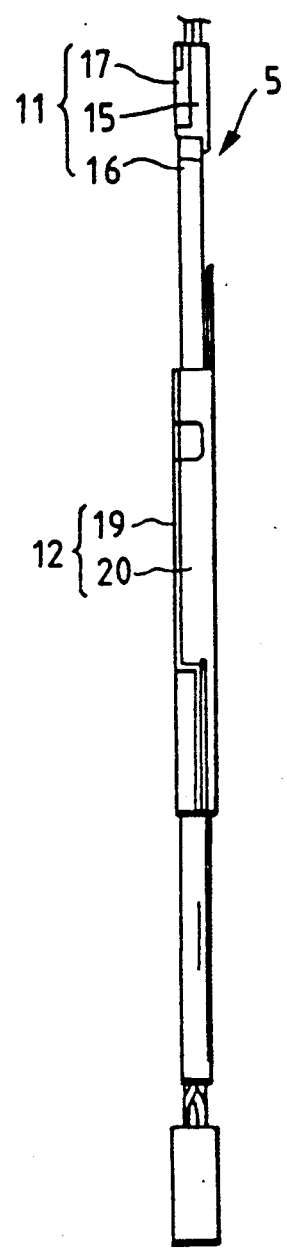

PROTECTING DEVICE FOR CABLES OF A STEERING COLUMN

BACKGROUND OF THE INVENTION

1. Field of the Invention

The present invention relates to a harness protecting device of a steering column, and more particularly to a harness protecting device of a steering column having a telescopic function.

2. Description of the Related Art

As is well known, harnesses composed of a number of lead wires connected to various electrical equipment around steering wheels are arranged on steering columns. It is required, particularly in steering columns of a telescopic type, that wiring be arranged so as to absorb contraction and expansion of the harness involved in a telescopic operation. As is described in Japanese Utility Model Examined Publication No. 63-32527, in order to make it possible to absorb such contraction and expansion of the harness, it is known that a harness protecting device, which is constructed in such a manner that a harness spool for housing in a loop-like fashion the intermediate part of the harness, is provided on the lower side of a steering column so that a loop can contract and expand in accordance with the telescopic operation of the steering column.

However, in such wiring as described above, since a boss section which internally contacts the loop of the harness is formed inside the harness spool, and the loop contracts and expands from a fixed point, which is a sliding section against the boss section, stress tends to occur between the boss section and the sliding section, especially when the loop contracts. Further, because the harness spool is formed in a multi-stage vortical chamber structure to house, as mentioned above, the harness in a loop-like fashion, the thickness of the harness spool increases. As a result, a space on the lower side of the steering column is substantially taken up, so that a space between a driver's knees and the lower steering column is narrowed, thereby impairing sitting comfort.

SUMMARY OF THE INVENTION

In view of the foregoing conventional art, it is an object of the present invention to provide a harness protecting device of a steering column in which no stress occurs when the harness contracts and expands, and which minimizes the space occupied by the device on the lower steering column.

In order to achieve the above-mentioned object, the present invention provides a protecting device for cables of a steering column, wherein the protecting device comprises a protector body, having a cable penetrating section in the front and the rear, equipped so as to contract and expand at will across the fixing side and the moving side of a steering column having a telescopic function, and a pair of bow-like holders, having flexibility, provided in the protector body, for dividing a plurality of single core cables introduced from the penetrating section, into two in the width direction of the protector body, and for retaining the single core cables, and wherein the cables, which are connected to electrical equipment attached to the moving side of the steering column, and which are wired along the steering column, are wired along the bow-like holders in the protector body so as to allow contraction and expansion.

Furthermore, in order to achieve the above-mentioned object, the present invention provides a protecting device for cables of a steering column, wherein the protecting device comprises a connecting part, having connecting rods extending in a bifurcate manner, equipped to the moving side of the steering column having a telescopic function, and a box-like fixing housing which is equipped to the fixing side of the steering column, and which is slidably connected t the connecting rods of the connecting part, and wherein the cables which are connected to the electrical equipment attached to the moving side of the steering column, and which are wired along the steering column, are housed in a space partitioned by the connecting part and the fixing housing, and the cables are arranged so as to allow contraction and expansion in the width direction of the fixing housing in the space.

When electrical equipment, such as a cable reel, moves along with the axial travel of a steering column, a plurality of single core cables connected to the electrical equipment are branched into a pair of bow-like holders, and are curved as the holders bend.

Further, the bifurcated connecting rods and a box-like fixing housing travel relative to each other, and a plurality of single core cables connected to the electrical equipment travel in the space enclosed by the connecting rods and the fixing housing.

Other features and advantages of the present invention will become apparent from the following Description of the Preferred Embodiment when read with reference to the attached drawings.

BRIEF DESCRIPTION OF THE DRAWINGS

FIG. 1 is a front view illustrating a protector;

FIG. 2 is a side view illustrating the protector;

DESCRIPTION OF THE PREFERRED EMBODIMENT

An embodiment of the present invention will be hereinafter described with reference to the accompanying drawings.

Figure 12:
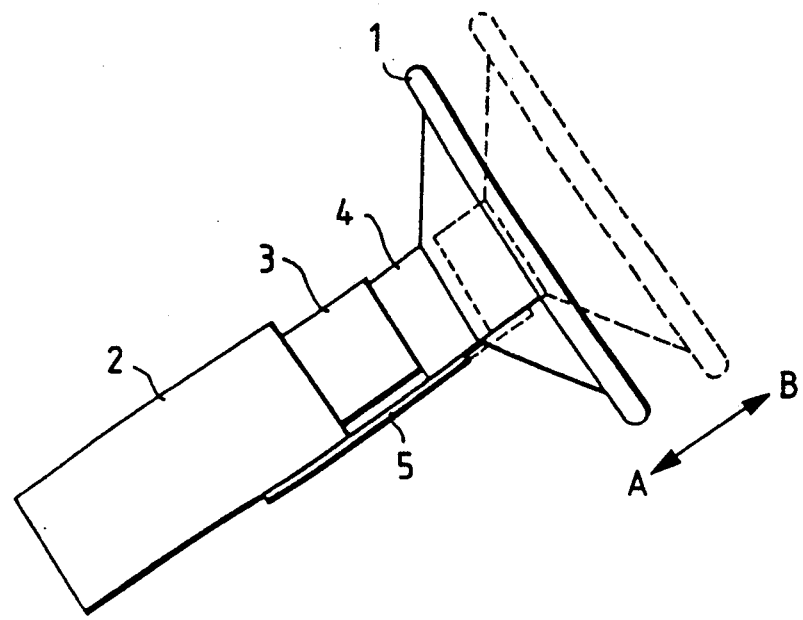
FIG. 12 is a schematic diagram showing how a protecting device for cables is installed.

FIG. 12 is a schematic diagram showing how a protecting device for cables is actually installed on a steering device having a telescopic function. In the same figure, numeral 1 denotes a steering wheel, numeral 2 denotes a member on the fixing side of a steering column, numeral 3 denotes a member on the moving side of the steering column, and numeral 4 denotes a cable reel (a piece of electrical equipment). The steering wheel 1 mounted on the member 3 on the moving side of the steering column and the cable reel 4 are so constructed as to move by the telescopic function (not shown) in the axial direction (direction indicated by an arrow A-B) of the steering shaft (not shown). Numeral 5 indicates a protector arranged between the cable reel 4 and the member 2 on the fixing side of the steering column, the protector 5 being capable of contracting an expanding in the direction indicated by the arrow A-B.

Figure 13:
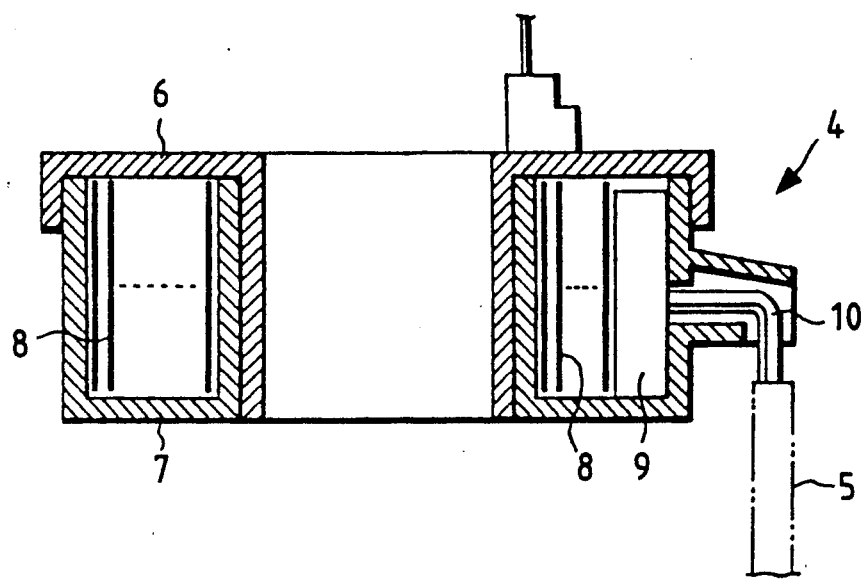
FIG. 13 is a cross-sectional view showing a cable reel.

FIG. 13 is a cross-sectional view schematically showing the structure of the cable reel 4. In FIG. 13, numeral 6 designates a moving part, while numeral 7 designates a fixing part, the moving part 6 and the fixing part 7 being rotatably snap-combined. A flat cable 8 wound around a plurality of turns is housed in the space which is enclosed by the moving part 6 and the fixing part 7, the beginning tip of the turns of the flat cable 8 being wired out of the moving part 6. Further, a plurality of single core cables 10 are connected via a connector 9 to the end tip of the turns of the flat cable 8, the single core cables 10 being wired out of the fixing part 7. The flat cable 8 is constructed so that a plurality of conductors are laminated by a pair of flexible films. The number of conductors utilized in this embodiment is five, two of which are utilized for an air bag circuit, and the remaining three are utilized for a cruise control circuit and a horn circuit.

The details of the protector 5 will now be described with reference to FIGS. 1 through 11.

Figure 3:
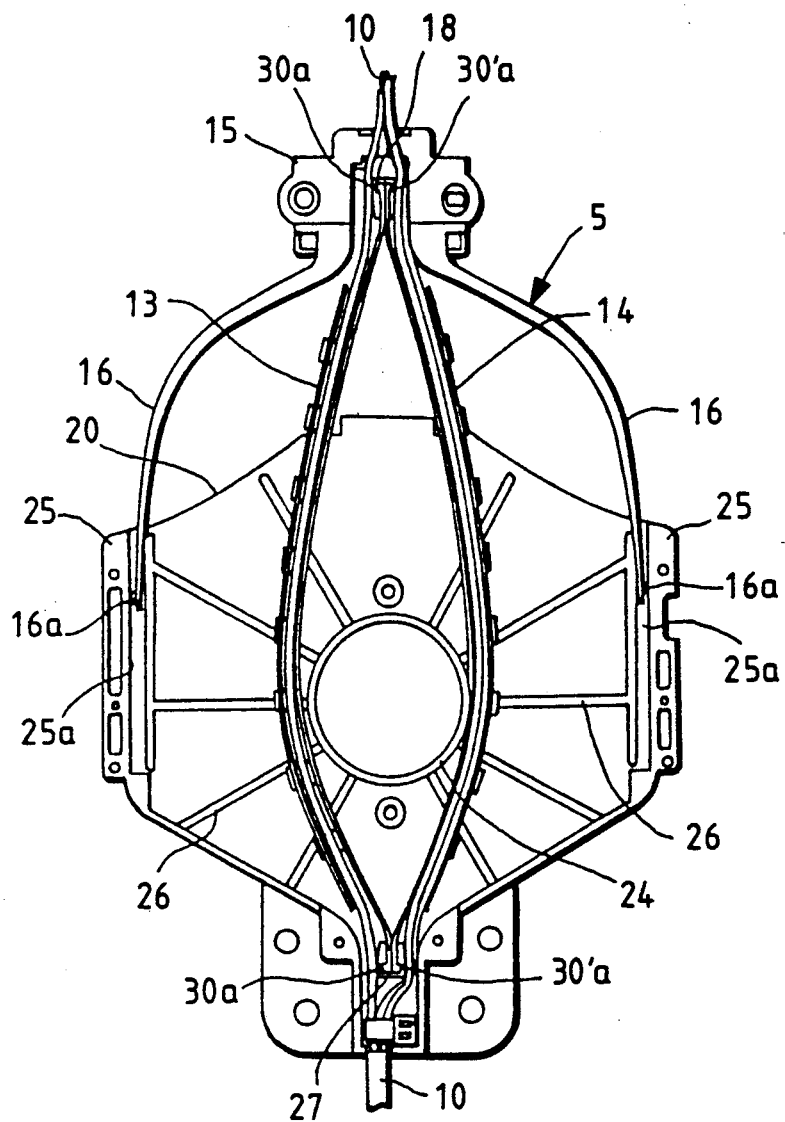
FIG. 3 is a front view illustrating the protector with a first case being removed.

FIG. 1 is a front view illustrating the protector 5; FIG. 2 is a side view illustrating the protector 5; and FIG. 3 is a front view illustrating the protector 5 with a first case being removed. As shown in these drawings, the protector 5 includes a connecting part 11 secured to the above cable reel 4, a housing 12 which contains the connecting part 11 so as to be slidable, and which is secured to a member in the fixing part, such as the member 2 on the fixing side of the steering column, and a first holder 13 and a second holder 14, both of which are interposed between the connecting part 11 and the housing 12. The single core cables 10 wired out of the fixing part of the cable reel 4 are connected, through a connector attached to the lower end of the protector 5, to a connector on the side of the car body, after having passed through the protector 5 while having being guided by both the holders 13, 14.

Figure 4:
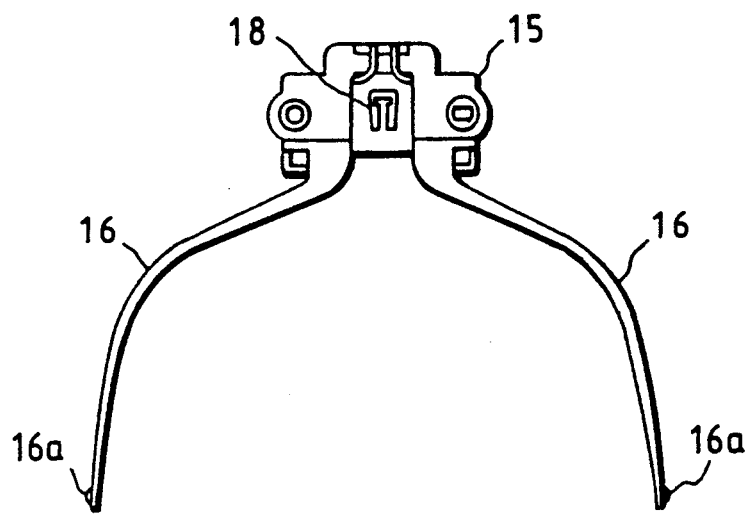
FIG. 4 is a front view showing a connecting part.

The connecting part 11 is made of a molded part of synthetic resin, and has, as illustrated in FIG. 4, a block-like attaching base 15 and a pair of connecting rods 16 which are bifurcated from the attaching base 15. A cover 17, having substantially the same shape as that of the attaching base 15, is fastened to the attaching base 15 by screws (see FIG. 2), and the cover 17 and the attaching base 15 define a cable penetrating section. A projected arresting click 18 is arranged on the inner bottom face of the cable penetrating section, and semi-spherical projections 16a are formed at the ends of the connecting rods 16 so as to be integrated into the rods 16.

Figure 5:
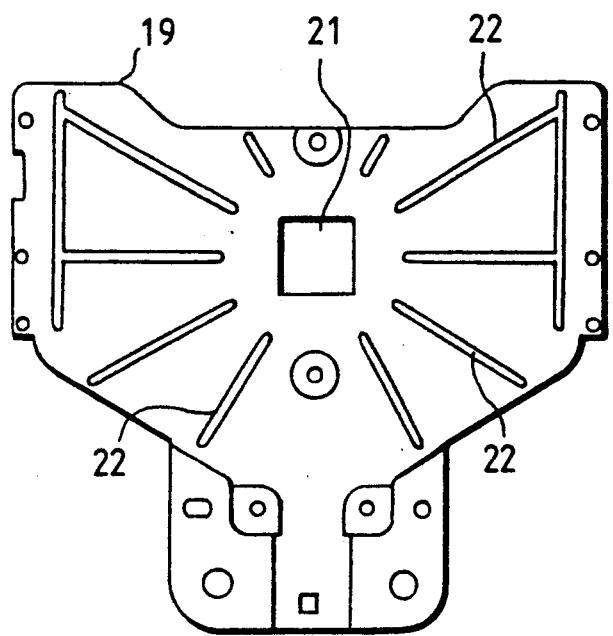
FIG. 5 is a rear elevation showing the first case.

The above-mentioned housing 12 includes a first case 19 and a second case 20 so as to be united and integrated by using screws, and is made of a molded part of synthetic resin. FIG. 5 is a rear elevation showing the first case 19. As is clear from the same figure, a square attaching aperture 21 is made in the first case 19, and a plurality of ribs 22 are disposed on the rear of the first case 19 so as to protrude. The ribs 22 are semi-spherical in cross section and extend radially from the attaching aperture 21.

Figure 6:
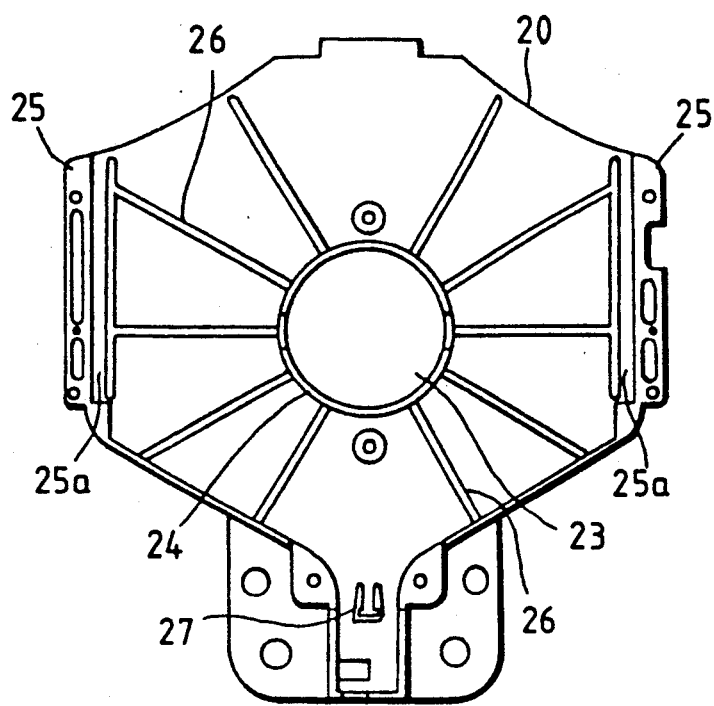
FIG. 6 is a front view showing a second case.

FIG. 6 is a front view showing the second case 20. As is apparent from FIG. 6, a circular attaching aperture 23 is made at the center of the second case 20. An annular wall 24 and banks 25 are respectively arranged on the periphery of the attaching aperture 23 and on both edges of the second case 20. Guide grooves 25a, through which the projections 16a of the connecting rods 16 slide, are positioned on both the insides of the banks 25. Furthermore, a plurality of ribs 26, whose shapes are semi-spherical in cross section, are disposed in the inner bottom face of the second case 20, and extend radially from the attaching aperture 23. The banks 25 extend in the lower direction and define a relatively narrow cable penetrating section by the fact that both the banks 25 come close to each other. An arresting click 27 is projected from the inner bottom face of the cable penetrating section. The first case 19 and the second case 20 as constructed above are united and integrated by using the screws, and the ribs 22 of the case 19 and the ribs 26 of the case 20 are arranged so as to oppose each other when both the cases 19 and 20 are united and integrated.

Figure 7:
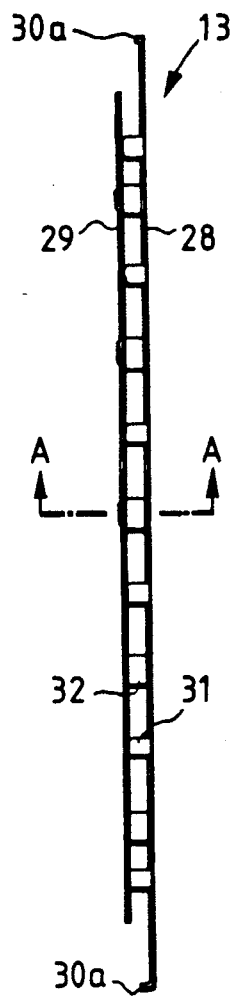
FIG. 7 is a front view depicting a first holder.
Figure 8:
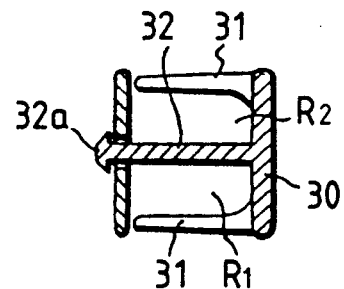
FIG. 8 is an enlarged cross-sectional view taken along line A—A of FIG. 7.
Figure 9:
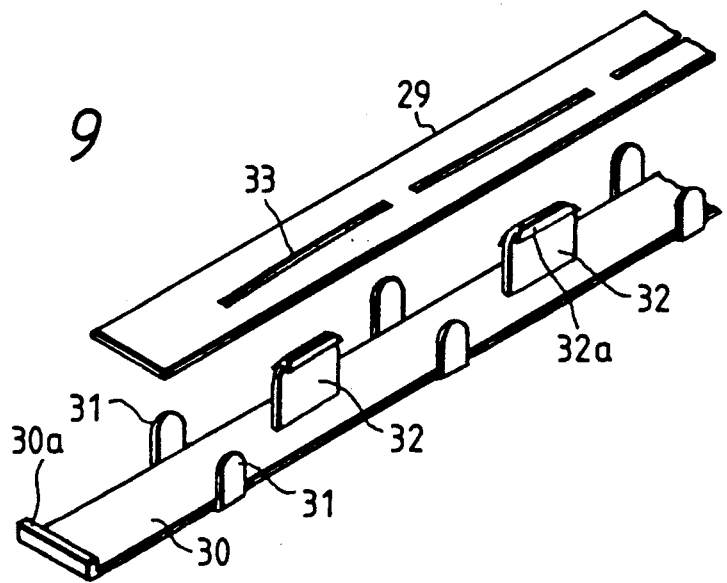
FIG. 9 is an exploded perspective view illustrating the first holder.

FIG. 7 is a front view depicting a first holder 13; FIG. 8 is an enlarged cross-sectional view taken along line A—A of FIG. 7; and FIG. 9 is an exploded perspective view illustrating the first holder 13. As clearly shown in these drawings, a first holder 13 is a combination of a holder base 28 and a cover film 29, both of which are shaped by very flexible synthetic resin. The holder base 28 includes a long, slender belt-like part 30 having arresting projections 30a on both ends, projected tongues 31 disposed on both edges of the longitudinal sides at fixed intervals, and partitions 32, having a projection 32a on its end, which are positioned along the center line at fixed intervals. The tongues 31 and the partitions 32 are alternately arranged along the longitudinal direction of the belt-like part 30. The cover film 29 is long and slender, and is a little short of the length of the belt-like part 30, slits 33 being formed along the center line. The cover film 29 becomes integrated into the holder base 28 by inserting the partitions 32 into the slits 33, and the projections 32a prevent the cover film 29 from coming off. Under these conditions, two spaces R1, R2, in which one or two cables from among the bunch of single core cables 10 are contained, are partitioned in the first holder 13 by the partitions 32a (see FIG. 8).

The second holder 14 is constructed in the same manner as that of the first holder 13, and in this embodiment, the corresponding parts are designated by like reference characters succeeded by an apostrophe (') to omit the explanations therefor.

Figure 10:
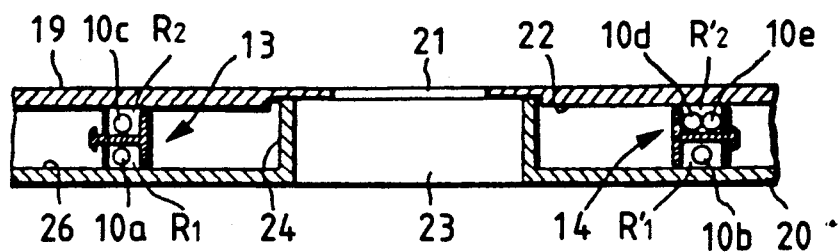
FIG. 10 is a cross-sectional view illustrating the main components of the protector.

Referring back to FIG. 3, the aforementioned first holder 13 and the second holder 14 are secured in a bow-shaped fashion to the attaching base 15 of the connecting part 11 and the second case 20 of the housing 12 by inserting each of the arresting projections 30a, 30'a into each of the arresting clicks 18, 27 and fastening them so that the first and second holders 13, 14 are capable of moving, in accordance with the relative position of the connecting part 11 and the housing 12, in the space between the annular wall 24 and the banks 25. The holders 13, 14 retain five single core cables 10 by branching them into two groups. That is, as illustrated in FIG. 10, one of the two single core cables 10a, 10b required for the air bag circuit is housed in the space R1 of the first holder 13, whereas the other is housed in the space R'1 of the second holder 14. One of the three single core cables 10c, 10d, 10e needed for the cruise control circuit and the horn circuit is housed in the space R2 of the first holder 13, while the other two are housed in the space R'2 of the second holder 14. Accordingly, a bunch of five single core cables 10 (10a through 10e) wired out of the fixing part 7 of the cable reel 4 is branched into two groups at the connecting part 11: one including the single core cable 10a for the air bag and the other including the single core cable 10b, and is then led to the housing 12 where the bunch of cables are bundled to be wired outside, after having being retained and guided by the first and second holders 13, 14.

Among such cable reels as constructed above, the moving part 6 of the cable reel 4 is fixed to the side of the steering wheel 1; the fixing part 7 of the cable reel 4 is fixed to the member 3 on the moving side of the steering column; the connecting part 11 of the protector 5 is fixed to the fixing part 7; and the housing 12 is fixed to the member 2 on the fixing side of the steering column. The above individual components are fixed to the corresponding parts for use. Further, when the steering wheel 1 rotates in one direction, the flat cable 8 is wound toward the wall of the inner wheel of the moving part 6, while on the contrary, when the steering wheel 1 rotates in the opposite direction, the flat cable 8 is wound back to the side of the inner wheel of the fixing part 7. In either case, an electrical connection between the moving part 6 and the fixing part 7 is maintained through the flat cable 8 and the single core cables 10 connected to the flat cable 8.

The steering wheel 1 is constructed so as to travel by the above-described telescopic function in the direction indicated by the arrow A-B in FIG. 12. FIG. 3 corresponds to a case where the steering wheel 1 is pulled to a position designated by the broken line in FIG. 12. In this case, the first and second holders 13, 14 expand to the maximum extent, facing each other across the annular wall 24.

Figure 11:
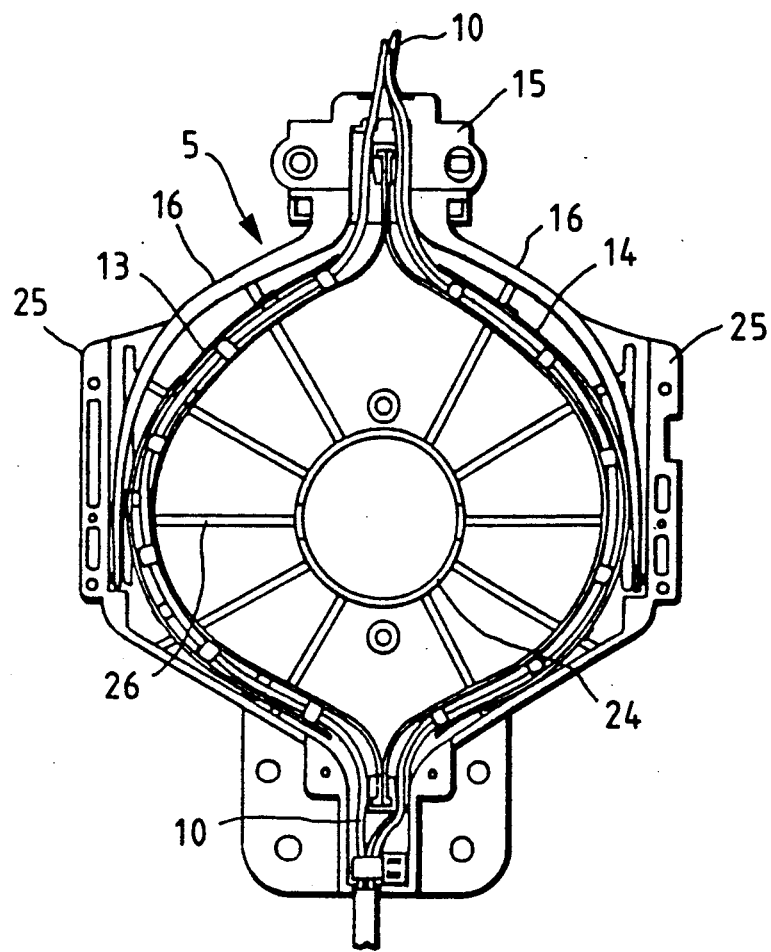
FIG. 11 is a front view illustrating how the protector contracts and expands.

On the contrary, when the steering wheel 1 is pushed to a position indicated by the solid line in FIG. 12, the projections 16a of the connecting rods 16 descend, as illustrated in FIG. 11, along the guide grooves 25a of the banks 25, causing the distance between the connecting part 11 and the housing 12 to become minimum. This change in shape is absorbed by the first and second holders 13, 14 being bent from the annular wall 24 to the banks 25, and the single core cable 10 are curved as the first and second holders 13, 14 are curved. In this case, since the end faces of the first and second holders 13, 14 move on the ribs 22, 26 provided in the first and second cases 19, 20, contact resistance does not increase, thereby permitting a smooth slide.

Thus, since a plurality of single core cables 10 are divided into two groups, and each of the groups is retained by flexible bow-shaped holders 13, 14, it is possible to prevent the single core cables 10 from being locally subjected to concentrated bending stress, and to make the protector 5 thin. Moreover, because both the holders 13, 14 are formed by a combination of the holder base 28 and the cover film 29 united by the partitions 32, two spaces R1, R2 can be partitioned in one holder. For these reasons, two single core cables 10a, 10b for the air bag circuit, which requires absolute reliability and safety as a prerequisite, can be branched into the holders 13, 14. Since the single core cables 10a, 10b can be isolated from other cables within one holder, it is possible to completely prevent the single core cables 10 from short-circuiting attributable to the wearing of the cables. Furthermore, because the holders 13, 14 are constructed so as to slide on the semi-spherical ribs 22, 26 formed on the first and second cases 19, 20, a sliding resistance diminishes, thereby causing the holders 13, 14 to be smoothly curved. Together with the prevention of a bending stress caused by the holders 13, 14, it is possible to prevent without fail the single core cables 10 from being damaged.

In addition, since a plurality of single core cables 10 are arranged between the relatively movable connecting part 11 and the housing 12, the single core cables 10 can be prevented from being damaged in transit or the like by the connecting part 11 and the housing 12 before the cable reel is incorporated into the steering device.

Further, the size of the protector 5 can be made smaller as compared with a case where both the connecting part 11 and the housing 12 are constructed in a box-like shape. This is because the connecting part 11 is constructed in the bifurcated rods, and makes it possible to provide the thin protector 5.

The number of single core cables is not limited to the number in the above-mentioned embodiment, but it may of course be increased or decreased as required.

As has been described, according to the present invention, because a plurality of single core cables connected to electrical equipment, such as a cable reel, are retained by a pair of flexible bow-shaped holders, before they are wired through a holder which can be curved, it is possible to arrange a plurality of single core cables in a narrow space without allowing the cables to interfere with each other, even when the distance between the moving part and fixing part of the steering column varies during a telescopic operation or the like. Furthermore, the bow-shaped holders are constructed so as to slide on the ribs provided on the inner face of the protector, with the result that the single core cables can be prevented from being damaged due to the fact that the bow-shaped holders can be smoothly bent. It is thus possible to provide a highly reliable protecting device for cables of the steering column.

In addition, because the single core cables are housed between the bifurcated connecting rods which are slidably connected to each other and the box-like fixing housing, it is possible to prevent the single core cables from being damaged by other equipment not only during the telescopic operation, but also in transit or the like before the cables are mounted on the steering device. Moreover, it is possible to make the protector for protecting the single core cables thin, thereby providing highly reliable serviceability.

The above has been offered for illustrative purposes only, and is not intended to limit the scope of the invention of this application, which is as defined in the claims below.

What is claimed is:

1. A protecting device for cables of a steering column, wherein said protecting device comprises a protector body, having a cable penetrating section in the front and the rear, equipped so as to contract and expand at will across the fixing side and the moving side of a steering column having a telescopic function, and wherein a plurality of single core cables which are connected to electrical equipment attached to the moving side of the steering column, and which are introduced from said penetrating section, are divided into two in the width direction of the protector body so as to contract and expand.

2. A protecting device for cables of a steering column according to claim 1, wherein said protecting device comprises a pair of bow-like holders, having flexibility, for retaining said single core cables which are divided into two, and wherein the cables wired along the steering column are wired so as to allow contraction and expansion along the bow-like holders in said protector body.

3. A protecting device for cables of a steering column according to claim 2, wherein said bow-like holders include belt-like parts opposing each other at fixed intervals and partitions connecting to the belt-like parts.

4. A protecting device for cables of a steering column according to claim 2, wherein ribs with which said bow-like holders come in contact are provided in the inner face of said protector body.

5. A protecting device for cables of a steering column, wherein said protecting device comprises a connecting part, having connecting rods extending in a bifurcate manner, equipped to the moving side of the steering column having a telescopic function, and a box-like fixing housing which is equipped to the fixing side of said steering column, and which is slidably connected to the connecting rods of said connecting part, and wherein the cables which are connected to the electrical equipment attached to the moving side of the steering column, and which are wired along the steering column, are housed in a space partitioned by the connecting part and the fixing housing, and the cables are arranged so as to allow contraction and expansion in the width direction of the fixing housing in said space.

* * * * *